United States Patent
Speldrich et al.

(10) Patent No.: US 8,164,007 B2
(45) Date of Patent: Apr. 24, 2012

(54) CONDUCTIVE ELASTOMERIC SEAL AND METHOD OF FABRICATING THE SAME

(75) Inventors: Brian Speldrich, Freeport, IL (US); Richard Wade, Worthington, OH (US)

(73) Assignee: Honeywell International, Morristown, NJ (US)

( * ) Notice: Subject to any disclaimer, the term of this patent is extended or adjusted under 35 U.S.C. 154(b) by 951 days.

(21) Appl. No.: 12/174,338

(22) Filed: Jul. 16, 2008

(65) Prior Publication Data

US 2010/0013165 A1  Jan. 21, 2010

(51) Int. Cl.
*H05K 7/02* (2006.01)

(52) U.S. Cl. ......... 174/541; 174/564; 277/316; 29/451; 73/721; 438/479

(58) Field of Classification Search .......... 174/541, 174/564; 264/272.15; 277/316; 29/890.1, 29/451, 621.1; 347/19; 156/108; 338/42; 73/721; 438/479

See application file for complete search history.

(56) References Cited

U.S. PATENT DOCUMENTS

| | | | | |
|---|---|---|---|---|
| 4,656,454 | A | * | 4/1987 | Rosenberger ............... 338/2 |
| 5,184,107 | A | | 2/1993 | Maurer ............... 338/42 |
| 5,558,500 | A | | 9/1996 | Elliott et al. ............ 416/220 R |
| 7,164,951 | B2 | | 1/2007 | Ries et al. ............... 607/37 |
| 7,354,309 | B2 | * | 4/2008 | Palinkas ............... 439/588 |
| 7,511,233 | B2 | * | 3/2009 | Pocrass ............... 174/541 |
| 2007/0289387 | A1 | | 12/2007 | Stewart et al. ............ 73/717 |

* cited by examiner

*Primary Examiner* — Dhirubhai R Patel
(74) *Attorney, Agent, or Firm* — Honeywell International Inc.

(57) ABSTRACT

Method for fabricating a conductive elastomeric seal, which includes a set of springs plated with an electrically conductive material. Initially, the set of springs can be held in a z-axis position in a mold cavity shaped like a seal. A liquid elastomer can be injected into the mold cavity in such a manner that the elastomer can be over molded around and through coils of each spring. Finally, the elastomer seal with the springs can be removed from the mold cavity, when the elastomer is cured. Ends of each spring can be kept free from the elastomer during over-molding such that the elastomeric seal can provide an electrical contact with a pressure sensor die and electrical leads molded into a sensor housing. Such a conductive elastomeric seal can prevent a die-edge shorting with the sense die in order to achieve long-term sensor reliability and performance.

17 Claims, 6 Drawing Sheets

CONDUCTIVE ELASTOMERIC SEAL AND METHOD OF FABRICATING THE SAME

TECHNICAL FIELD

Embodiments are generally related to pressure sensors. Embodiments are more particularly related to a conductive elastomeric seal, which is utilized in the context of pressure sensors. Embodiments are additionally related to the fabrication of conductive elastomeric seals.

BACKGROUND OF THE INVENTION

High pressure sensors are utilized in a wide range of sensing applications. For such applications, differential pressure sensors may accurately sense the pressure of a fluid media. Such differential pressure sensors can be configured utilizing semiconductor technology. The most common differential pressure sensors are solid-state silicon pressure sensors. The pressure sensors may incorporate a pressure sense die to measure the media pressure by detecting the difference in pressure between two pressure ports of the high pressure sensors.

Additionally, the pressure sensor die of the pressure sensor can be squeezed between two elastomer seals by an external package. One of the elastomer seals is electrically conductive in order to connect a number of electrical terminals or molded leads to the pressure sense die. The sensitive pressure sense die can be sandwiched between the elastomer seals contained within a plastic housing. Such a pressure sensor design allows the conductive seal to be slightly offset relative to the pressure sense die in the plastic housing due to manufacturing tolerances. The conductive elastomeric seal can be compressed against the sense die in order to make a pneumatic seal and good electrical connection.

Moreover, the conductive seal includes silver filled regions, which establish electrical contact with pads on the face of the sensor die. The conductive path can extend from the die pads through the seal in a z-axis to the leads molded into the mating surface of the sensor package on the other side of the conductive seal. The conductive seal may, however, cause an electrical short if the die pads are forced over the edge of the sense die, because the sense die typically constitutes a semiconductor. In particular, electrical shorting occurs when the conductive seals wrap over the edge of the sense die. The electrical shorting may short out a Wheatstone bridge or other electronic circuitry located on the sensor package such that it changes the sensor output intermittently. This intermittent sense output is difficult to detect during manufacturing and results in a "die-edge shorting" in the pressure sensors.

A prior pressure sensor utilizes a spring slid into a circular sleeve punched out of an elastomer seal. Such a conductive seal can also exhibit an inherent electrical shorting problem with the sense die if perfect alignment is not held when the package is snapped together. Therefore, a die-edge shorting may occur when the sense die is compressed against the seals, which can lead to a sensor malfunction or failure. Hence, it is more desirable to prevent the sensing die, circuitry and electrical connections from exposure to die-edge shorting in order to ensure reliable operation of the pressure sensor.

Based on the foregoing it is believed that a need exists for an improved conductive seal, which prevents die-edge shorting with the sense die and which is ultimately more efficient and sturdier than presently implemented pressure sensors. Such conductive seals are described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is therefore one aspect of the present invention to provide for an improved conductive elastomeric seal utilized in the context of high pressure sensors.

It is another aspect of the present invention to provide an improved method for fabricating a conductive elastomeric seal.

The aforementioned aspects and other objectives and advantages can now be achieved as described herein. An improved method for fabricating a conductive elastomeric seal, which includes a set of springs plated with an electrically conductive material. Initially, the set of springs can be held in a z-axis position in a mold cavity shaped like a seal. A liquid elastomer can be injected into the mold cavity in such a manner that the elastomer can be over molded around and through coils of each spring. Finally, the elastomer seal with the springs can be removed from the mold cavity, when the elastomer is cured. Ends of each spring can be kept free from the elastomer during over-molding such that the elastomeric seal can provide an electrical contact with a pressure sensor die and electrical leads molded into a sensor housing. Such a conductive elastomeric seal can prevent a die-edge shorting with the sense die in order to achieve long-term sensor reliability and performance.

The spring can be oriented vertically and placed near an x, y position of the sensor die. The spring can be designed to make a spring helix utilizing a small diameter of wire such that the spring can flex with the surrounding elastomer. Additionally, the spring can exhibit stiffness similar to the elastomer. An overall diameter of the spring can be configured with a size of the bond pads of the sensor die. The end of the spring can be squared and ground so that the spring can be exposed on each surface of the elastomer seal to make robust electrical contact.

Furthermore, the elastomeric seal with the conductive spring can be placed over the sensor die, so that the spring can be aligned with die bond pads and the molded-in leads of the pressure sensor. Similarly, the media seal can typically be placed on the other side of the sensor die. Then, the elastomeric seal, the media seal and the sensor die can be compressed together, within a plastic housing to form a pneumatic media seal on both sides of a pressure sensor diaphragm and to establish a good electrical connection.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
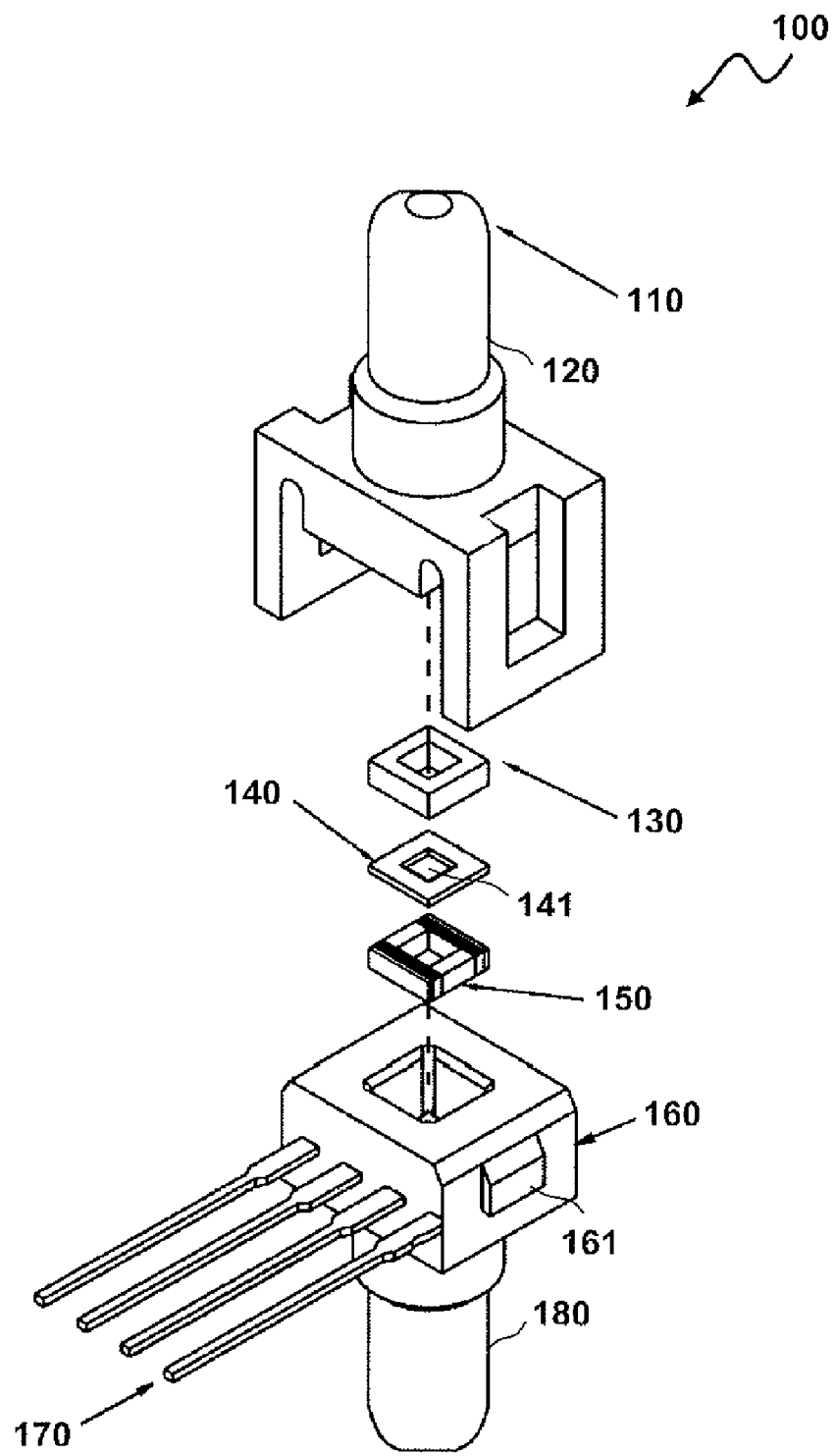
FIG. 1 illustrates a detailed and exploded view of a high pressure sensor, in which embodiments of the present invention may be implemented.

FIG. 1 illustrates a detailed and exploded view of a high pressure sensor 100, in which embodiments of the present invention may be implemented. The high pressure sensor 100 can be designed utilizing a semiconductor technology. The high pressure sensor 100 comprises two pressure ports 120 and 180 for allowing media to pass through therein. The two pressure ports 120 and 180 can be preferably configured from a metal or thermoplastic material. The two pressure ports 120 and 180 can be incorporated with a metal or plastic cover 110. Note that in FIGS. 1-5 identical or similar parts or elements are generally indicated by identical reference numerals.

A silicon pressure sense die 140 can be hermetically bonded to the pressure port 120 utilizing an elastomeric media seal 130 for sensing a pressure between the media to evaluate media pressure. The difference between pressures in each pressure port 120 and 180 can be measured by passing the media through the sense die 140 in order to calculate the pressure in the media. The sense die 140 can include a diaphragm 141 and multiple electrically conductive bond pads (not shown) therein. The diaphragm 141 can be utilized for absorbing the pressure applied by the media. The diaphragm 141 can be made of thin silicon materials in order to measure even very minute pressure in the media. The electrically conductive bond pads of the sense die 140 can be electrically connected to the diaphragm 141 in order to output electrical signals.

Furthermore, the diaphragm 141 can be incorporated with piezoresistive elements (not shown) that convert the deformation of the diaphragm 141 due to the applied pressure into electrical signals utilizing well-known piezoresistive principles in order to compute the pressure in the media. The bond pads of the sense die 140 can be integrated on the piezoresistive elements. The sense die 140 can further be electrically bonded with a conductive elastomeric seal 150 in order to electrically connect several external electrical terminals or molded leads 170 to the sense die 140. The media seal 130, the sense die 140 and the conductive seal 150 can be incorporated into a metal or plastic housing 160, into which the electrical terminals or leads 170 can be molded. The housing 160 can include a set of lugs that is utilized to snap the housing 160 and the cover 110 together. Such high pressure sensor 100 can improve the accuracy of the sensing output signal.

Figure 2:
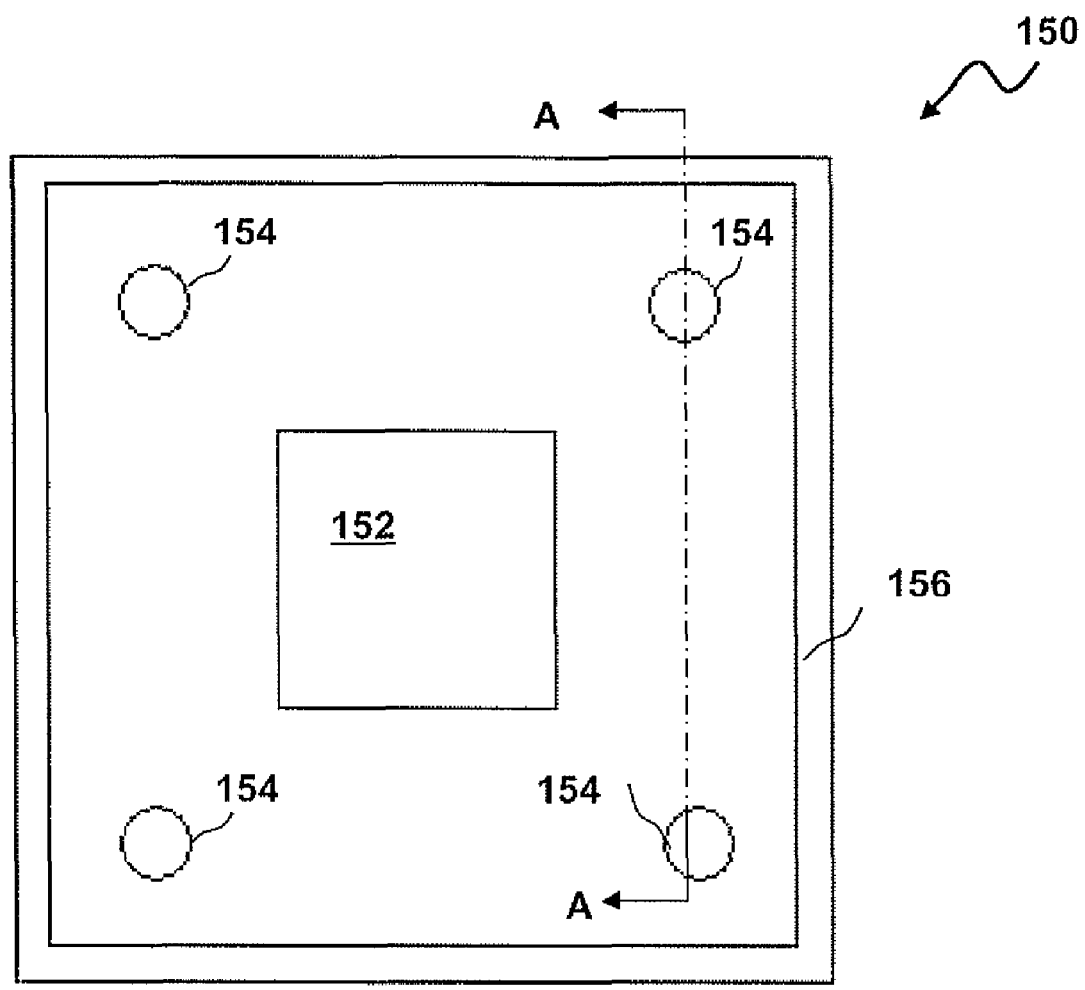
FIG. 2 illustrates an enlarged view of a conductive elastomeric seal as shown in FIG. 1, in accordance with a preferred embodiment.

FIG. 2 illustrates an enlarged view of a conductive elastomeric seal 150 as shown in FIG. 1, in accordance with a preferred embodiment. The conductive seal 150 comprises a central opening 152 and a set of springs (these are electrically conductive metal, we don't want to limit ourselves to "plated electrically conductive material") 154 that is plated with an electrically conductive material. The conductive seal 150 can be made of an elastically curing material, i.e. elastomer 156, intermixed with conductive particles. The central opening 152 can be disposed proximate to a lower surface of the diaphragm 141 in the sensor die 140, as shown in FIG. 1. The central opening 152 can be provided for allowing the media to pass through.

Figure 3:
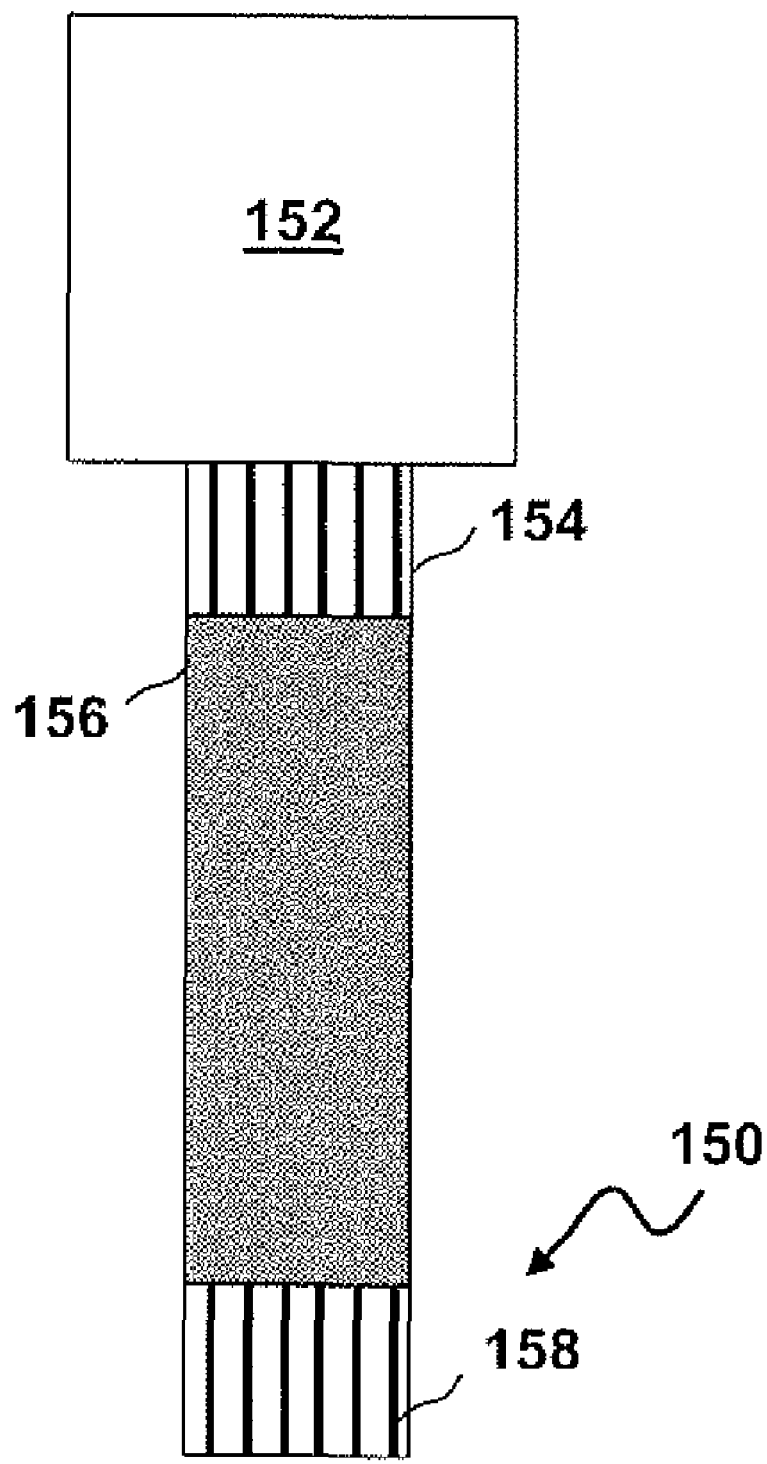
FIG. 3 illustrates a cross-sectional view of the conductive elastomeric seal as shown in FIG. 2 along line A-A, in accordance with a preferred embodiment.
Figure 6:
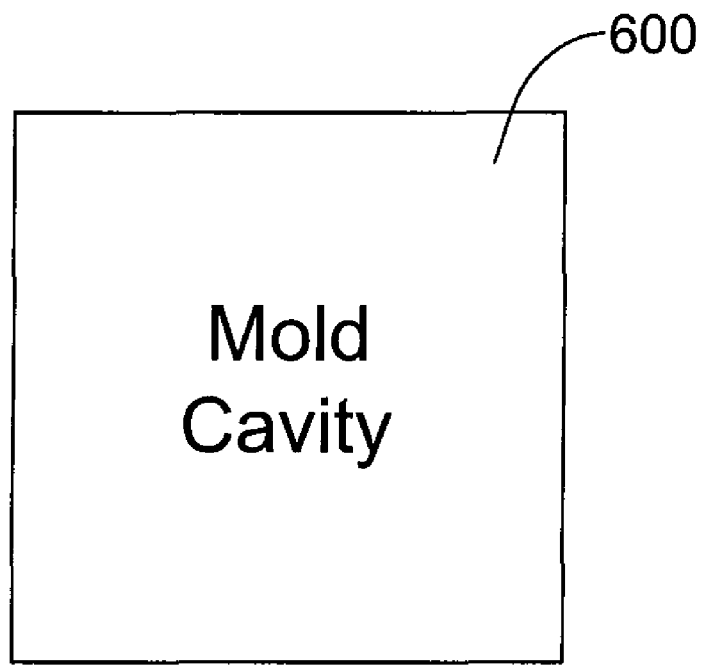
FIG. 6 shows a labeled representation of a mold cavity.

The conductive seal 150 can be incorporated with several conductive springs 154 based on design requirements. The conductive springs 154 can be held in a correct position in a mold cavity 600 (see FIG. 6) shaped like a seal. The design is flexible enough to allow for alignment features for the springs, nubs of steel in tool, which will not change the function of the seal but will significantly improve the manufacturability of the design. The liquid elastomer 156 can be injected into the mold cavity 600 in such a manner that the elastomer 156 can mold around and through coils 158, as illustrated in FIG. 3, of each spring 154. Finally, the elastomer seal 150 with the springs 154 can be removed from the mold cavity 600, when the elastomer 156 is cured. Ends of each spring 154 can be kept free from the elastomer 156 such that the conductive elastomeric seal 150 can provide an electrical contact with the sensor die 140 and the electrical terminals or leads 170 molded into the sensor housing 160. Such an elastomer molding results in an enhanced sensor part formation and an increased capability of meeting the dimensional tolerances.

FIG. 3 illustrates a cross-sectional view of the conductive elastomeric seal 150 as shown in FIG. 2 along line A-A, in accordance with a preferred embodiment. This image looks wrong. It should be a coil spring in the cross section (have more angled shapes to it rather than straight lines). Also, the springs should be inside of the corners, not on the corners as this will cause the die edge shorting. The spring 154 can be oriented vertically and placed near an x, y position of the bond pads of the sensor die 140. The spring 154 can be designed to make a spring helix utilizing a small diameter of wire, i.e. 0.001 inch or less, such that the spring 154 can flex with the surrounding elastomer 156. Additionally, the spring 154 can exhibit a stiffness similar to the elastomer 156. An overall diameter of the spring 154 can be configured with a size of the bond pads of the sensor die 140. The end of the spring 154 can be squared and ground so that the spring 154 can be exposed on each surface of the elastomer seal 150 to make robust electrical contact. Note that in FIGS. 1-5 identical or similar parts or elements are generally indicated by identical reference numerals.

The spring rate of a rubber seal, i.e. elastomer seal 150, can be expressed as indicated in equation (1.1) as follows:

$$k = AE/t \tag{1.1}$$

For example, according to equation (1.1), the spring rate can be defined as equations (1.2) and (1.3) by assuming constant values.

$$k = (0.10952 - 0.0572 \text{ in}**2)*(750 \text{ psi})/(0.040 \text{ in}) \tag{1.2}$$

$$k = 163 \text{ pounds per inch (lbs/in)} \tag{1.3}$$

The spring rate for four springs 154 can be about 10 percent of the original seal 150. These four springs 154 can be arranged in parallel, wherein each spring 154 exhibits a spring rate k as indicated in equation (1.4) as follows:

$$k = (163 \text{ lb/in})*(1/10)*(1/4) = 4 \text{ lbs/in} \tag{1.4}$$

The media seal 140 and the conductive elastomer seal 150 can be 0.020 inch and 0.040 inch thick, respectively, when the sensor stack is compressed at 0.017 inch. In particular, the conductive elastomer seal 150 can hold two-third of the overall compression. For example, force F, received by each spring 154 during compression, can be defined as equation (1.5) by assuming k=4 lbs/in.

$$F = (2/3)*(0.017 \text{ in})*(4 \text{ lb/in}) = 0.046 \text{ lbs} \tag{1.5}$$

Moreover, the spring 154 cannot stick above the surface of the conductive seal 150, since the conductive seal 150 can be over molded with a slight circular depression around the spring 154 with a diameter of 1.5 inch and about 0.003 inch deep. Therefore, it ensures that there is no silicone over the metal termination of the spring 154, which allows the conductive seal 150 to occur around a rim of a sensor chip. These dimensions of the conductive springs 154 are described for purposes of clarity and specificity; however, they should not be interpreted in any limiting way. Other dimensions are also possible. However, it will be apparent to those of skill in the art that the dimensions can be changed without departing from the scope of the invention.

Figure 4:
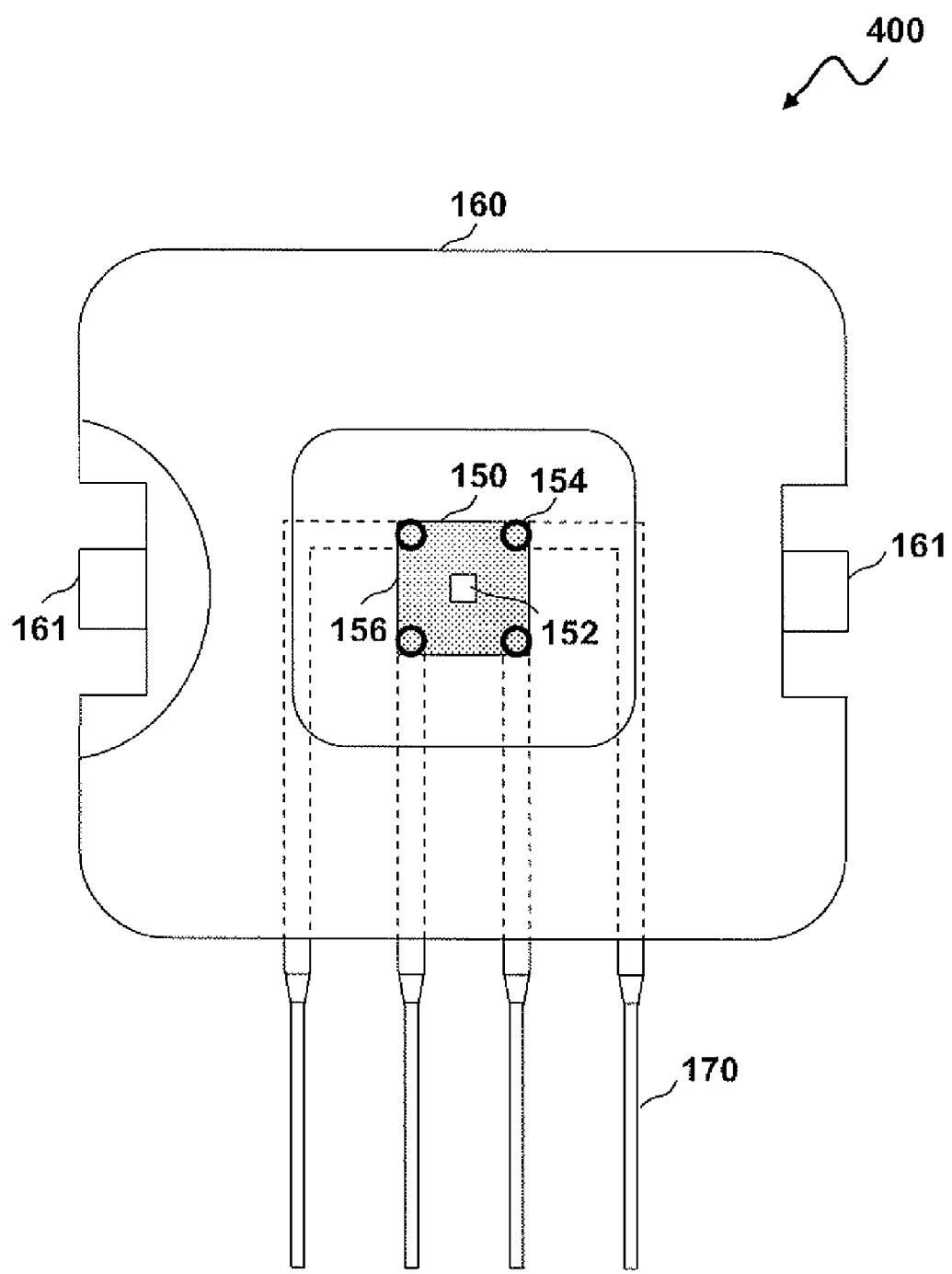
FIG. 4 illustrates a plan view of an electrical connection arrangement of the conductive elastomeric seal with molded-in leads, in accordance with a preferred embodiment.

FIG. 4 illustrates a plan view of an electrical connection arrangement 400 of the conductive elastomeric seal 150 with molded-in leads 170, in accordance with a preferred embodiment. The set of conductive springs 154 can be disposed directly over the electrically conductive bond pads on the sense die 140 in such a manner that a number of electrically molded leads 170 are in electrical contact with the sense die 140. The conductive seal 150 can be placed within the sensor housing 160 that is provided with a set of lugs 161. The set of lugs 161 can be located on the exterior of the housing 160, wherein the lugs 161 allow the housing 160 and the cover 110 to lock together.

Moreover, the elastomer seal 150 can be disposed between the sense die 140 and the housing 160, where the elastomer seal 150 is selectively conductive and resilient. The springs 154 can be over molded with the elastomer 156, which allows the elastomer 156 to pass in between the spring coils 158 and holds the spring 154 into place in z-axis. These springs 154 can be held in all three axes by an over molded elastomer matrix, so that the springs 154 can be aligned with the bond pads of the sensor die 140 and the molded-in leads 170 of the pressure sensor 100. The ends of the spring 154 can be kept free from the elastomer 156 during over molding, such that the springs 154 provide an electrical contact with both the sensor die 140 and the electrical leads 170 molded into the housing 160.

Similarly, the media seal 130 can typically be placed on the other side of the sensor die 140. Then, the conductive elastomeric seal 150, the media seal 130 and the sensor die 140 can be compressed together, within the housing 160, to form a pneumatic media seal on both sides of the pressure sensor diaphragm 141 and to establish an enhanced electrical connection. Such an elastomer seal 150 with the conductive springs 154 can avoid slipping over the edge of the sensor die 140 and creating shorting problems with an underlying epi layer of the sensor die 140. Hence, the conductive elastomeric seal 150 can prevent a die-edge shorting with the sense die 140, which enables long-term sensor reliability and performance.

Figure 5:
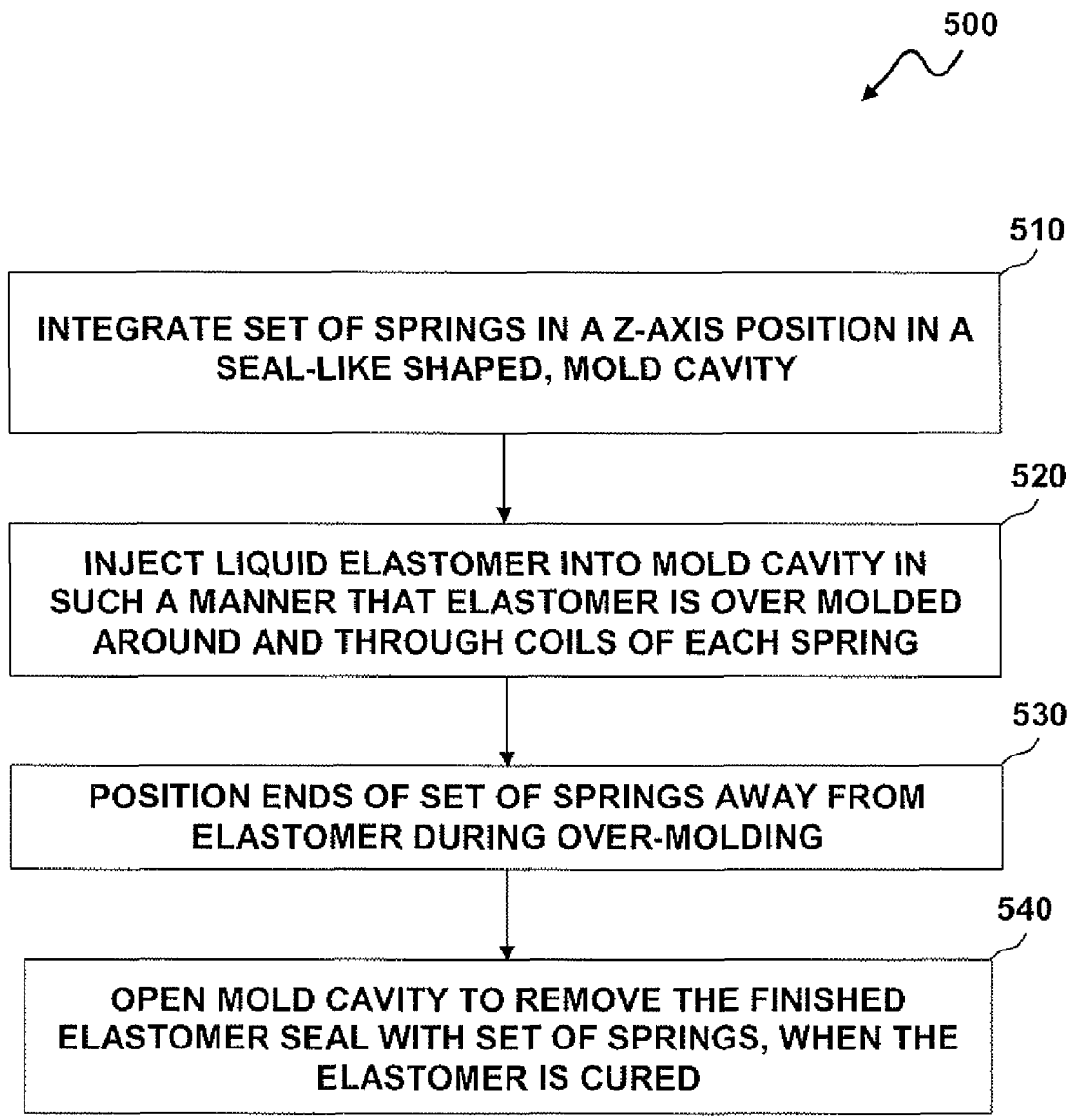
FIG. 5 illustrates a flow chart illustrative of a method for fabricating the conductive elastomeric seal, in accordance with an alternative embodiment.

FIG. 5 illustrates a flow chart illustrative of a method 500 for fabricating the conductive elastomeric seal 150, in accordance with an alternative embodiment. As illustrated at block 510, a set of springs 154 can be located in a z-axis position in a seal-like mold cavity 600. The set of springs 154 can be plated with an electrically conductive material or you can rely on the conductivity of the spring material. The cavity 600 can be configured as a seat for preparing the conductive elastomer seal 150. As described at block 520, a liquid elastomer 156 can be injected into the mold cavity 600 in such a manner that the elastomer 156 can be over molded around and through the coils 158 of each spring 154.

Thereafter, as depicted at block 530, ends of each spring 154 can be positioned away from the elastomer 156 during over-molding, so that the elastomer seal 150 can provide an electrical contact with the pressure sensor die 140 and the electrical leads 170 molded into the sensor housing 160. Finally, as indicated at block 540, the mold cavity 600 can be opened to remove the finished elastomer seal 150 with the set of springs 154, when the elastomer 156 is cured. Such a conductive elastomer seal 150 can prevent die edge shorting problems with the underlying epi layer of the sensor die 140.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for fabrication of a conductive elastomer seal, comprising:
   providing a plurality of springs in a z-axis position in a mold cavity, wherein said plurality of springs are electrically conductive;
   injecting a liquid elastomer into said mold cavity in such a manner that said liquid elastomer is over molded around and through a plurality of coils of said plurality of springs to form an elastomer seal; and
   after said liquid elastomer is cured, withdrawing said elastomer seal with said plurality of springs from said mold cavity, wherein both ends of said plurality of springs are kept free from said liquid elastomer during the injecting step.

2. The method for fabrication of a conductive elastomer seal of claim 1, wherein said plurality of springs are is arranged parallel and oriented vertically in the mold cavity.

3. The method for fabrication of a conductive elastomer seal of claim 1, further comprising, placing said plurality of springs near a predetermined x,y position within the mold cavity.

4. The method for fabrication of a conductive elastomer seal of claim 1, further comprising, placing said plurality of springs at locations that correspond to a plurality of bond pads of a sensor die.

5. The method for fabrication of a conductive elastomer seal of claim 1 wherein said conductive elastomer seal is configured to be compressed against a sensor die to provide a pneumatic seal and an electrical connection between a plurality of die pads of said sensor die and a plurality of electrical leads of a sensor housing.

6. A method for packaging a sensor die, comprising:
   providing a conductive elastomer seal, wherein the conductive elastomer seal includes a liquid elastomer over molded around and through a plurality of coils of a plurality of conductive springs in a mold cavity; and
   compressing said conductive elastomer seal against a sensor die to provide a pneumatic seal, as well as form an electrical connection between a plurality of die pads of said sensor die and a plurality of electrical leads of a lead frame of a sensor housing.

7. The method of claim 6, wherein ends of said plurality of springs are kept free from said liquid elastomer during an over-molding process such that said elastomeric seal can provide an electrical contact between the plurality of die pads of the sensor die and the plurality of electrical leads of the sensor package.

8. The method of claim 6, wherein said plurality of springs are arranged parallel to one another and oriented vertically through the conductive elastomer seal.

9. The method of claim 6, wherein each of said plurality of springs are placed near an x,y position of a corresponding one of the plurality of die pads of said sensor die.

10. The method of claim 6, wherein the plurality of springs are positioned to be aligned with the plurality of die pads of said sensor die and said plurality of electrical leads of said sensor housing.

11. The method of claim 10, wherein said plurality of electrical leads are molded into the sensor housing.

12. A conductive elastomer seal, comprising a liquid elastomer over molded around and through a plurality of coils of a plurality of springs in a mold cavity, wherein said conductive elastomer seal is compressible against a sensor die to provide a pneumatic seal, as well as form an electrical connection between a plurality of die pads of said sensor die and a plurality of electrical leads of a sensor housing.

13. The conductive elastomer seal of claim 12, wherein liquid elastomer seal is free of said plurality of springs at its ends to enable said elastomeric seal to provide an electrical contact with said plurality of die pads of said sensor die and said plurality of electrical leads of said sensor housing while preventing die-edge shorting.

14. The conductive elastomer seal of claim 12, wherein said plurality of springs are arranged parallel to one another and oriented vertically through the conductive elastomer seal.

15. The conductive elastomer seal of claim 12, wherein said plurality of springs are each positioned at predetermined x,y position.

16. The conductive elastomer seal of claim 12, wherein said plurality of springs are positioned to align with the plurality of die pads of said sensor die and said plurality of electrical leads of said sensor housing.

17. The conductive elastomer seal of claim 12, wherein the plurality of electrical leads are molded into the sensor housing.

* * * * *